US006959886B1

(12) United States Patent  
Rho

(10) Patent No.: US 6,959,886 B1
(45) Date of Patent: Nov. 1, 2005

(54) BAIT CASTING REEL

(76) Inventor: Yeon Seok Rho, Mok-Dong Bless-Ville 507-Ho, 340 Sinjeong 2(i)-Dong, Yang Cheon-Gu, Seoul (KR)

( * ) Notice: Subject to any disclaimer, the term of this patent is extended or adjusted under 35 U.S.C. 154(b) by 0 days.

(21) Appl. No.: 10/990,192

(22) Filed: Nov. 16, 2004

(51) Int. Cl.$^7$ ............................................. A01K 89/02
(52) U.S. Cl. ................... 242/289; 188/181 A
(58) Field of Search .................. 242/289; 188/181 A

(56) References Cited

U.S. PATENT DOCUMENTS

| | | | | |
|---|---|---|---|---|
| 5,308,021 A | * | 5/1994 | Ikuta | 242/289 |
| 6,336,605 B1 | * | 1/2002 | Littau et al. | 242/289 |
| 6,364,230 B1 | * | 4/2002 | Kawasaki | 242/289 |
| 6,371,396 B1 | * | 4/2002 | Kawasaki | 242/289 |
| 6,481,657 B1 | * | 11/2002 | Oishi et al. | 242/289 |
| 6,908,054 B1 | * | 6/2005 | Kim et al. | 242/289 |
| 2004/0050990 A1 | * | 3/2004 | Seo | 242/289 |

FOREIGN PATENT DOCUMENTS

| | | |
|---|---|---|
| JP | 02-011885 | 1/1990 |
| JP | 2003-125679 | 5/2003 |

* cited by examiner

*Primary Examiner*—Emmanuel Marcelo
(74) *Attorney, Agent, or Firm*—Brooks Kushman P.C.

(57) ABSTRACT

A brake device of a bait casting reel includes a shoe housing coupled to the spool shaft and having a plurality of pairs of sliding grooves and a plurality of pairs of insertion pins; a plurality of brake shoes slidably received in the sliding grooves and defined with elongate holes in which the insertion pins are inserted; a brake drum defining a plurality of braking surfaces which have different inner diameters; a brake drum moving member into which the brake drum is fitted; a sub cover fixed to a main cover with the brake drum moving member accommodated in the sub cover; springs placed between the brake drum moving member and the sub cover; and a cam member rotatably coupled to the sub cover and defined with a plurality of sets of cam grooves which have different engagement heights.

3 Claims, 8 Drawing Sheets

US 6,959,886 B1

BAIT CASTING REEL

BACKGROUND OF THE INVENTION

1. Field of the Invention

The present invention relates to a bait casting reel, and more particularly, to a bait casting reel which is constructed to prevent a fishline from becoming tangled when casting bait.

2. Background Art

As is well known in the art, a bait casting reel is a rotatory device attached to a fishing rod at the butt, for winding up or letting out a fishline. The bait casting reel has a reel body and a handle. In the reel body, there are provided a spool from or on which the fishline is paid out or wound, a spool driving mechanism for rotating the spool, a drag mechanism for preventing the unintentional release of the fishline, and a level winding mechanism for evenly distributing the fishline on the spool when winding the fishline on the spool. The handle is connected to the spool driving mechanism and disposed outside the reel body, to allow a fishline winding operation to be easily conducted.

By this construction, in a state wherein a weight and a fishhook having bait are connected to a distal end of the fishline, by flicking the fishing rod, the weight and bait are cast to a desired place. At this time, as the spool is rotated at high speed due to a force induced by the weight, the fishline wound on the spool is paid out.

In the bait casting reel, if the spool which is rotated at high speed is not properly braked during casting, since the spool rotates faster than the fishline is drawn from the spool, the fishline is continuously paid out from the spool due to the inertia of the rotating spool even though the cast is completed, as a result of which the fishline is likely to become tangled around the spool between the spool and the reel body. Therefore, in order to prevent the fishline from becoming tangled, it is necessary to decrease the rotational speed of the spool by lightly pressing the thumb against the rotating spool. Nevertheless, in the conventional bait casting reel, after the spool is rotated due to the force induced by the weight connected to the fishline, the force for rotating the spool changes finely depending upon the inertia of the spool which depends on the cast, so even for an expert fisherman, it is difficult to properly perceive a manual braking time. For this reason, backlash may result to tangle the fishline.

SUMMARY OF THE INVENTION

Accordingly, the present invention has been made keeping in mind the above problems occurring in the prior art, and an object of the present invention is to provide a bait casting reel which is constructed to prevent a fishline from being paid out due to the inertia of a rotating spool when a cast is completed and from becoming tangled.

In order to achieve the above object, according to one aspect of the present invention, there is provided a bait casting reel including a spool which has a spool shaft rotatably supported in a reel body and on which a fishline is wound, a spool driving mechanism for rotating the spool, a handle for manipulating the spool driving mechanism, a brake device for selectively limiting rotation of the spool, and a main cover for holding the brake device in the reel body, the brake device comprising: a shoe housing coupled to the spool shaft to be rotated integrally therewith and having a plurality of pairs of sliding grooves which extend radially in different directions and a plurality of pairs of insertion pins which project from bottom surfaces of the pairs of sliding grooves so that respective pairs of insertion pins are separated from inner ends of the respective pairs of sliding grooves by different distances; a plurality of brake shoes slidably received in the sliding grooves of the shoe housing an defined with a plurality of elongate holes in which the insertion pins of the shoe housing are inserted, respectively; a guide plate coupled to the shoe housing to prevent the release of the brake shoes from the sliding grooves of the shoe housing; a brake drum for receiving the shoe housing and the guide plate, the brake drum defining a plurality of braking surfaces which have different inner diameters; a brake drum moving member into which the brake drum is fitted, the brake drum moving member having projecting arms which project downward and engagement lips which are formed at distal ends of the projecting arms; a sub cover fixed to the main cover in a state in which the brake drum moving member is accommodated in the sub cover, and having holes for allowing the passage of the engagement lips of the projecting arms of the brake drum moving member; springs placed between the brake drum moving member and the sub cover; and a cam member rotatably coupled to the sub cover and defined with a plurality of sets of cam grooves in which the engagement lips of the projecting arms of the brake drum moving member having passed through the holes of the sub cover can be engaged, the respective sets of cam grooves having different engagement heights.

According to another aspect of the present invention, it is preferred that inclined surfaces be formed at boundary regions between two adjoining braking surfaces of the brake drum.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE PREFERRED EMBODIMENTS

Figure 1:
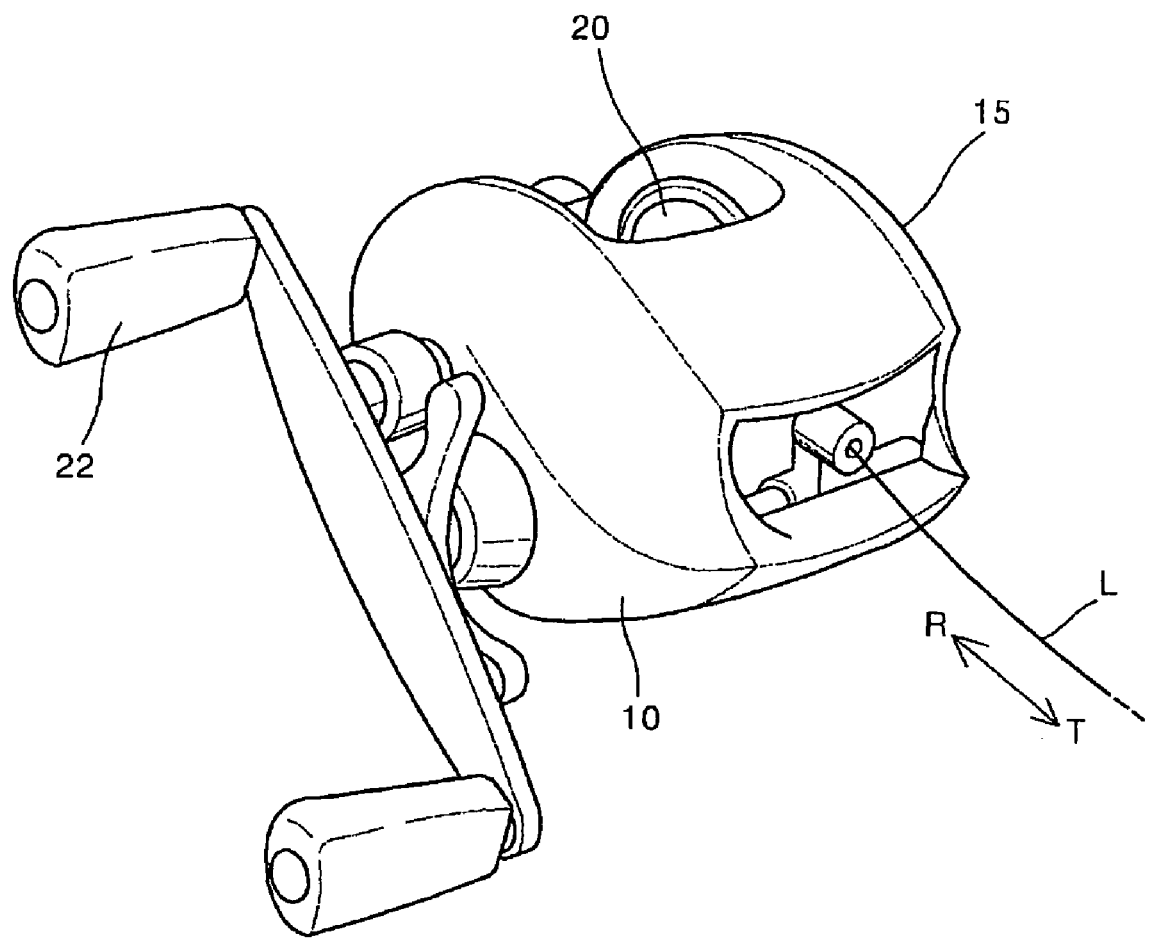
FIG. 1 is a perspective view illustrating an outer appearance of a bait casting reel in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
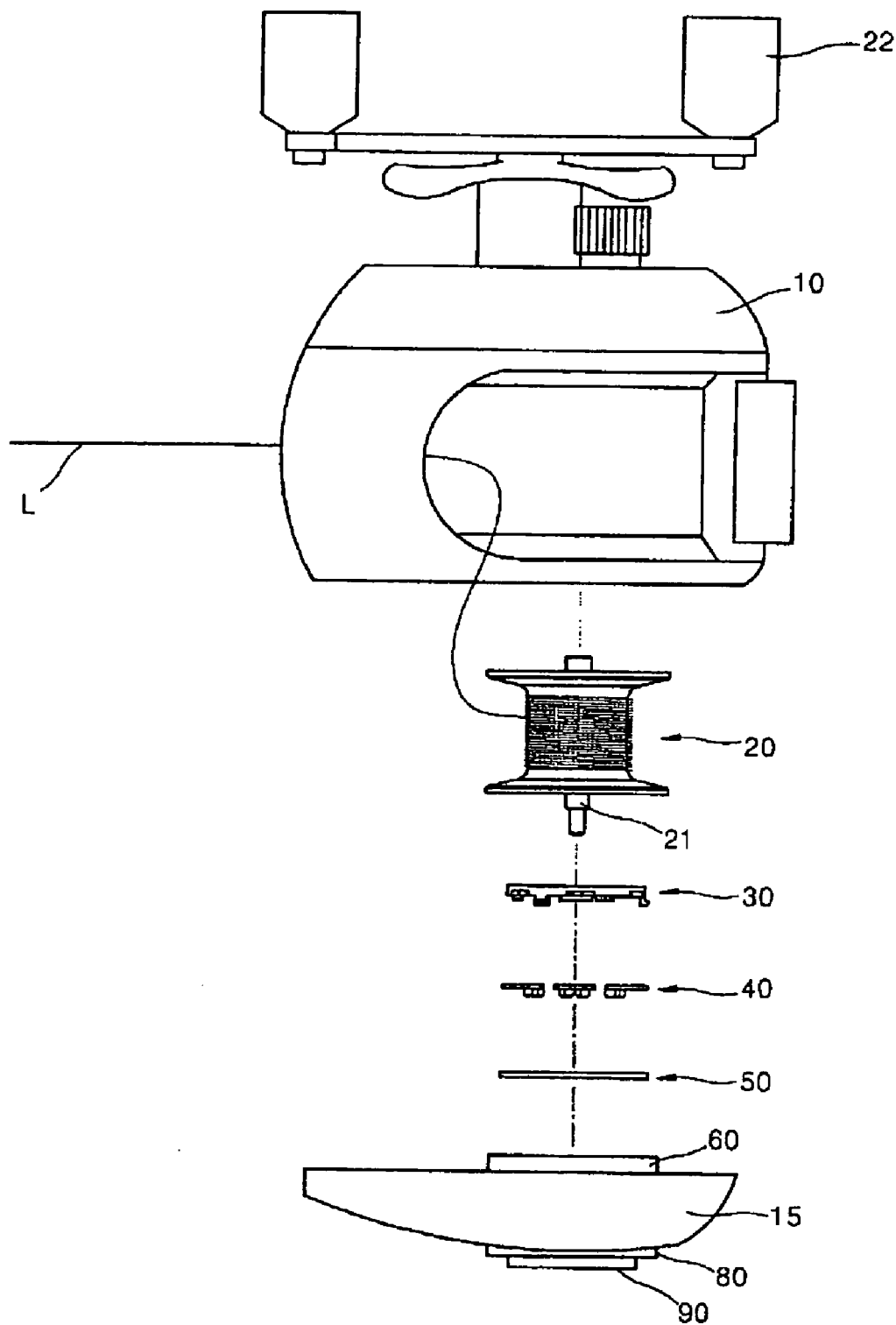
FIG. 2 is an exploded plan view illustrating main component elements of the bait casting reel according to the present invention.
Figure 3:
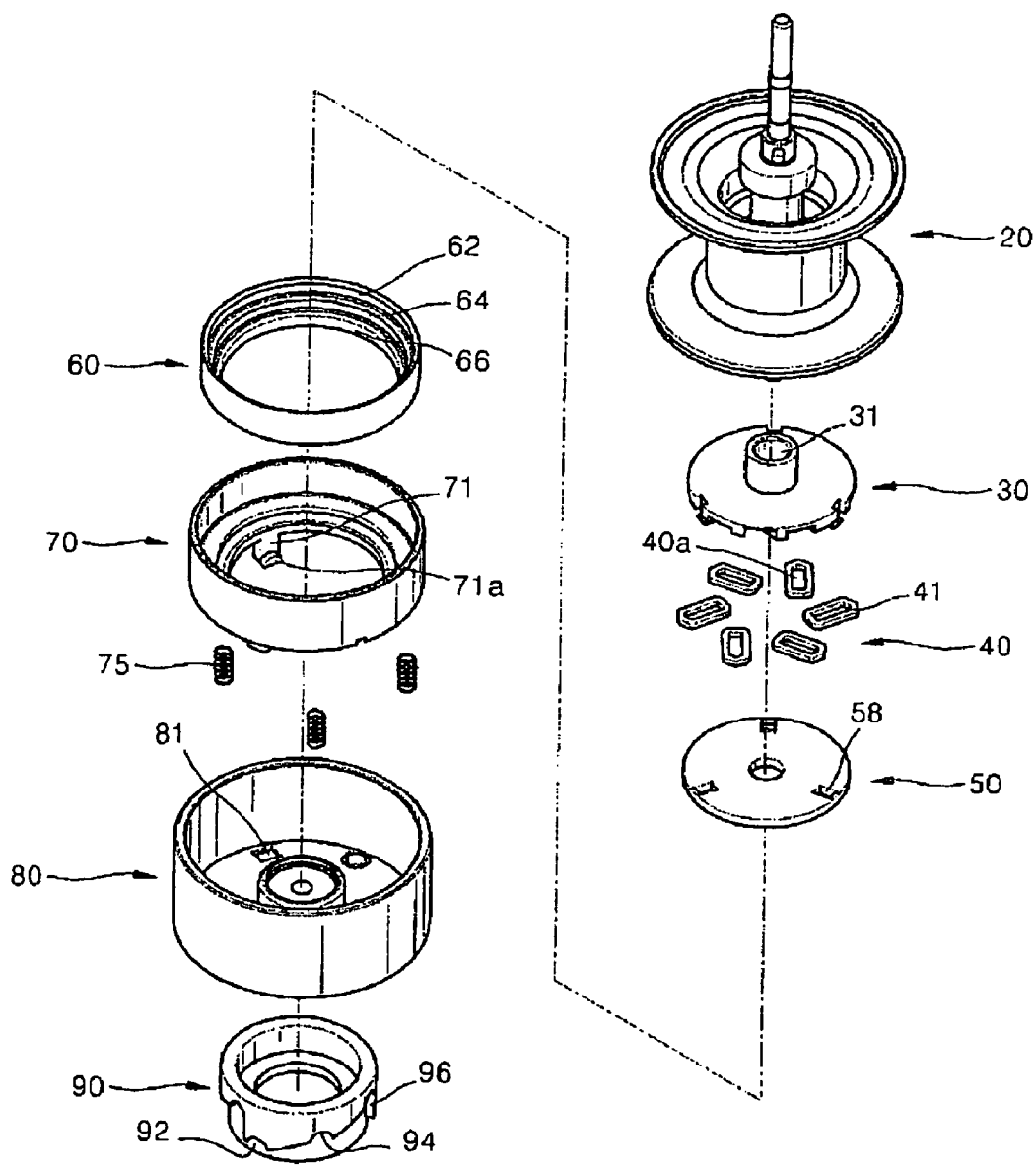
FIG. 3 is an exploded top perspective view independently illustrating a spool and a brake device of the bait casting reel according to the present invention.
Figure 4:
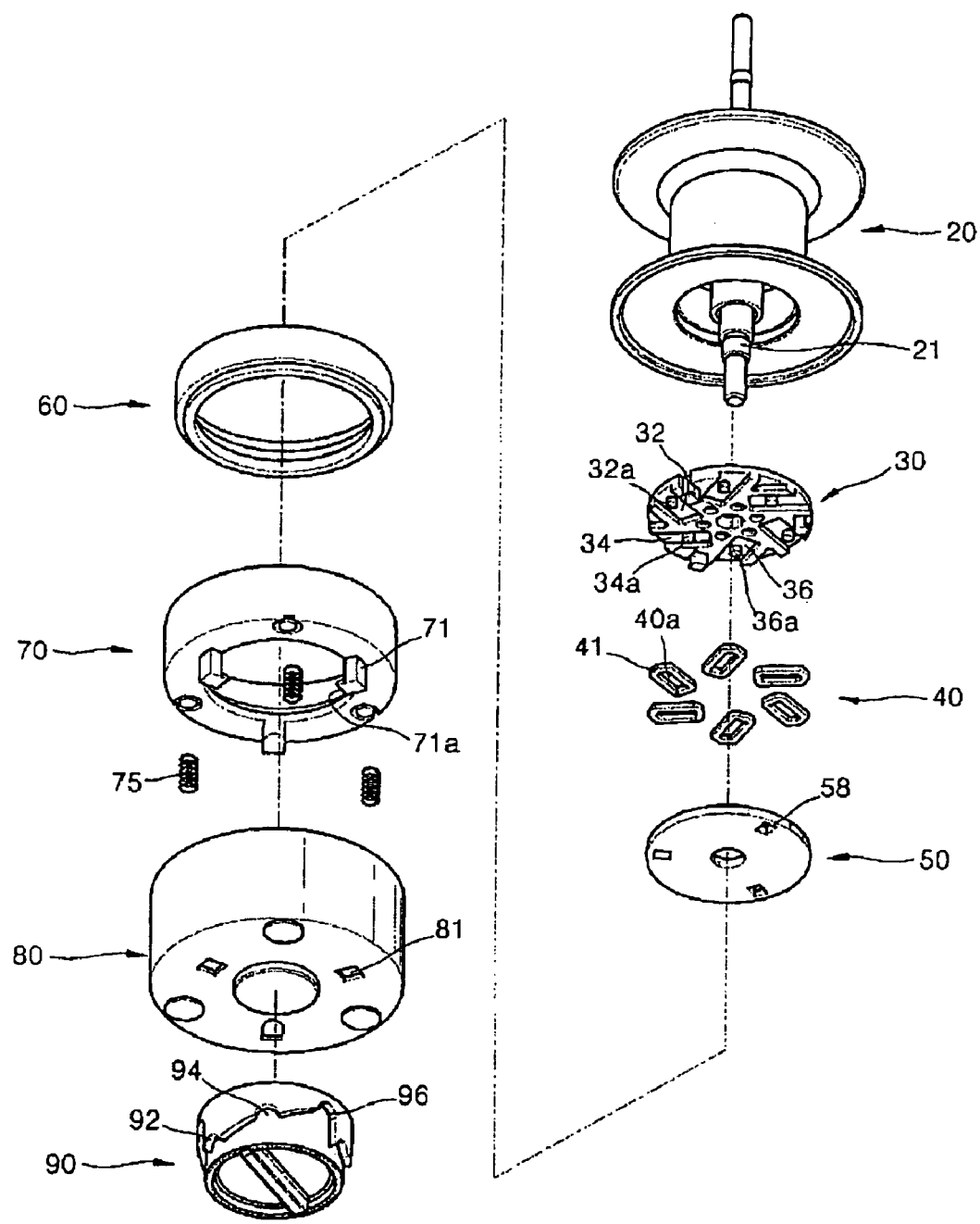
FIG. 4 is an exploded bottom perspective view independently illustrating the spool and the brake device of the bait casting reel according to the present invention.
Figure 5:
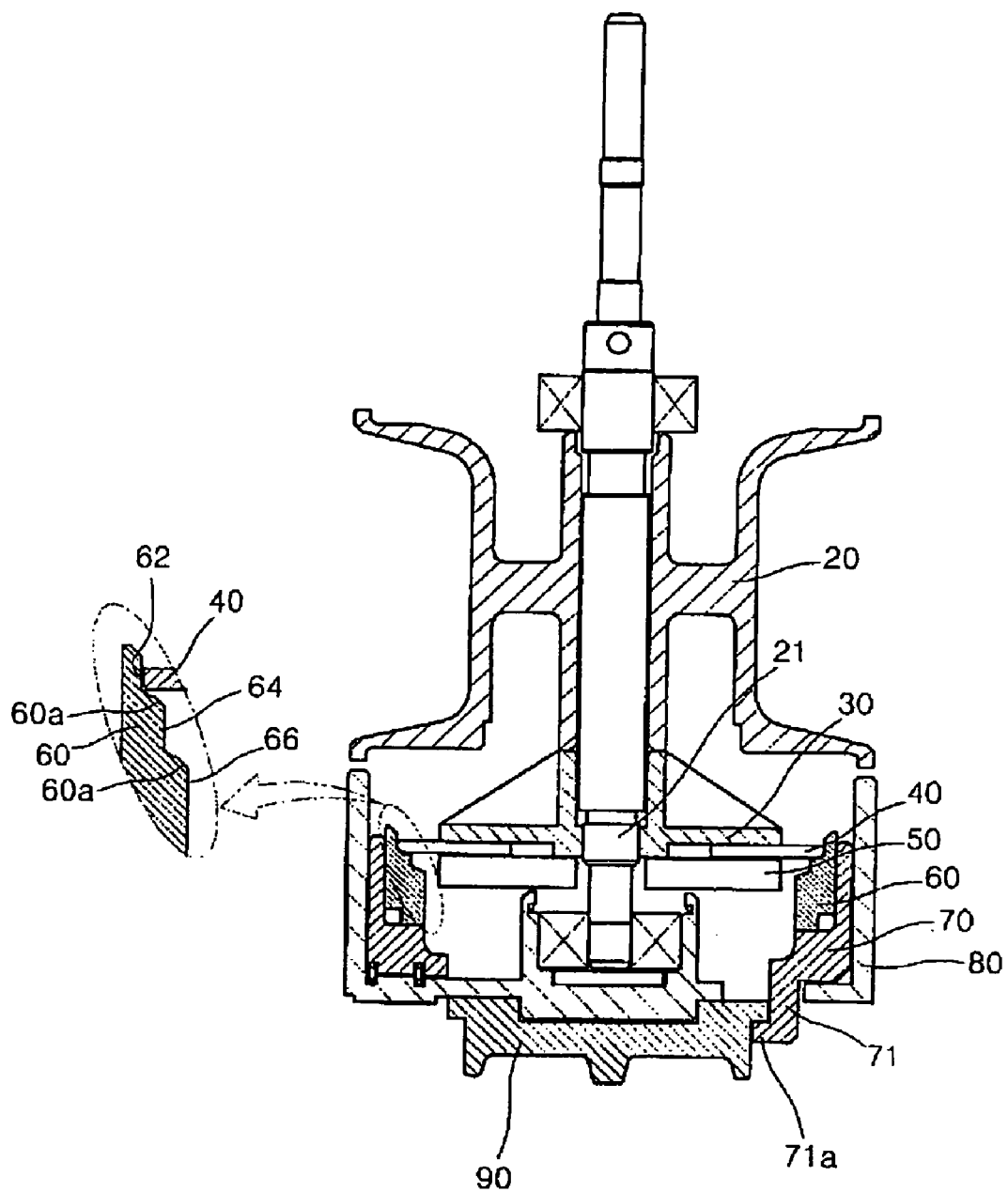
FIG. 5 is a cross-sectional view illustrating a state in which the spool and the brake device shown in FIGS. 3 and 4 are assembled with each other.

FIG. 1 is a perspective view illustrating an outer appearance of a bait casting reel in accordance with an embodiment of the present invention; FIG. 2 is an exploded plan view illustrating main component elements of the bait casting reel according to the present invention; FIG. 3 is an exploded top perspective view independently illustrating a spool and a brake device of the bait casting reel according to the present invention; FIG. 4 is an exploded bottom perspective view independently illustrating the spool and the brake device of the bait casting reel according to the present invention; and FIG. 5 is a cross-sectional view illustrating a state in which the spool and the brake device shown in FIGS. 3 and 4 are assembled with each other.

As shown in the drawings, a bait casting reel in accordance with an embodiment of the present invention includes a spool 20 which has a spool shaft 21 rotatably supported in a reel body 10 and on which a fishline L is wound, a spool driving mechanism (not shown) for rotating the spool 20, a handle 22 for manipulating the spool driving mechanism and thereby rotating the spool 20, a drag mechanism (not shown) for preventing unintentional release of the fishline L, a level winding mechanism (not shown) for evenly distributing the fishline L on the spool 20 when winding the fishline L on the spool 20, a brake device for selectively limiting rotation of the spool 20, and a main cover 15 for holding the brake device in the reel body 10. Since the drag mechanism and the level winding mechanism are the same as those adopted in a conventional bait casting reel, detailed descriptions thereof will be omitted herein.

The brake device according to the present invention comprises a shoe housing 30, six brake shoes 40, and a guide plate 50. The shoe housing 30 is coupled to the spool shaft 21 to be rotated integrally with the spool 20. The shoe housing 30 has first, second and third pairs of sliding grooves 32, 34 and 36, and first, second and third pairs of insertion pins 32a, 34a and 36a. The first, second and third pairs of sliding grooves 32, 34 and 36 are defined to extend in different radial directions which are set at predetermined angles from one another on the same plane adjacent to a center of the shoe housing 30. The first, second and third pairs of insertion pins 32a, 34a and 36a project from bottom surfaces of the first, second and third pairs of sliding grooves 32, 34 and 36 so that the respective pairs of insertion pins 32a, 34a and 36a are separated from inner ends of the respective pairs of sliding grooves 32, 34 and 36 by different distances. The brake shoes 40 are slidably received in the first, second and third pairs of sliding grooves 32, 34 and 36 of the shoe housing 30. The brake shoes 40 are defined with elongate holes 40a in which the first, second and third pairs of insertion pins 32a, 34a and 36a of the shoe housing 30 are inserted, respectively. The guide plate 50 is coupled to the shoe housing 30 to prevent the release of the brake shoes 40 from the first, second and third pairs of sliding grooves 32, 34 and 36 of the shoe housing 30.

The brake device further comprises a brake drum 60, a brake drum moving member 70, a sub cover 80, springs 75, and a cam member 90. The brake drum 60 receives the shoe housing 30 and the guide plate 50. The brake drum 60 defines first, second and third braking surfaces 62, 64 and 66 which have different inner diameters. Inclined surfaces 60a are formed at boundary regions between two adjoining braking surfaces 62, 64 and 66 of the brake drum 60. The brake drum 60 is fitted into the brake drum moving member 70. The brake drum moving member 70 has projecting arms 71 which project downward from a lower surface of the brake drum moving member 70 and engagement lips 71a which are formed at distal ends of the projecting arms 71. The sub cover 80 is fixed to the main cover 15 in a state in which the brake drum moving member 70 is accommodated in the sub cover 80. The sub cover 80 has holes 81 for allowing passage of the engagement lips 71a of the projecting arms 71 of the brake drum moving member 70. The springs 75 are placed between the brake drum moving member 70 and the sub cover 80. The cam member 90 is rotatably coupled to the sub cover 80. The cam member 90 is defined, on an outer surface thereof, with first, second and third sets of three cam grooves 92, 94 and 96 in which the engagement lips 71a of the projecting arms 71 of the brake drum moving member 70, having passed through the holes 81 of the sub cover 80, can be engaged. The respective sets of cam grooves 92, 94 and 96 have different engagement heights.

When viewed in its entirety, the shoe housing 30 substantially has a disc-shaped configuration. The shoe housing 30 is defined at the center thereof with a fixing hole 31 in which the spool shaft 21 is fixed, so that the shoe housing 30 is securely coupled to the spool shaft 21. The first, second and third pairs of sliding grooves 32, 34 and 36 defined around the fixing hole 31 are concavely formed on a lower surface of the shoe housing 30. At this time, the first pair of insertion pins 32a which are formed in the first pair of sliding grooves 32 are closest to the center of the shoe housing 30, the third pair of insertion pins 36a which are formed in the third pair of sliding grooves 36 are farthest from the center of the shoe housing 30, and the second pair of insertion pins 34a which are formed in the second pair of sliding grooves 34 are positioned between the first and third pairs of insertion pins 32a and 36a.

Between two adjoining sliding grooves 32, 34 and 36, guide plate fastening projections 38, each substantially having an L-shaped configuration, are formed on an edge of the shoe housing 30 to extend downward.

A contact part 41 is formed on a radial outer end surface of the brake shoe 40 to be brought into frictional contact with the first, second and third braking surfaces 62, 64 and 66 of the brake drum 60. The contact part 41 is inclined at a predetermined inclination angle from a middle portion thereof to maximize the contact area between the radial outer end surface of the brake shoe 40 and an inner surface of the brake drum 60.

The brake shoes 40 are slidably received in the first, second and third pairs of sliding grooves 32, 34 and 36 of the shoe housing 30 such that the first, second and third pairs of insertion pins 32a, 34a and 36a are inserted into the elongate holes 40a of the brake shoes 40, respectively. At this time, due to the fact that the respective pairs of insertion pins 32a, 34a and 36a are separated from the inner ends of the respective pairs of sliding grooves 32, 34 and 36 by different distances, the movable distances of the brake shoes 40 having the elongate holes 40a, in which the first, second and third pairs of insertion pins 32a, 34a and 36a are inserted, are correspondingly limited.

In order to ensure that the brake shoes 40 are slidably received in the first, second and third pairs of sliding grooves 32, 34 and 36 of the shoe housing 30 in such a way as to be prevented from being released from the shoe housing 30, the guide plate 50 is defined through a bottom wall thereof with locking holes 58 so that the guide plate fastening projections 38 of the shoe housing 30 can be locked through the locking holes 58, respectively.

The first, second and third braking surfaces 62, 64 and 66 which are defined on the inner surface of the brake drum 60 substantially create a step-shaped configuration. As can be readily seen from FIG. 5, the inclined surfaces 60a are formed between the first and second braking surfaces 62 and 64 and between the second and third braking surfaces 64 and 66, respectively. Due to the presence of these inclined surfaces 60a, when the brake drum 60 is moved in an axial direction by virtue of the brake drum moving member 70, the brake shoes 40 can be smoothly moved from the first to the second braking surfaces 62 and 64 or vice versa, and from the second to the third braking surfaces 64 and 66 or vice versa.

The brake drum moving member 70 moves the brake shoes 40 between the first, second and third braking surfaces 62, 64 and 66 by moving the shoe housing 30 in the axial direction.

The projecting arms 71 and the engagement lips 71a of the brake drum moving member 70 pass through the holes 81 of the sub cover 80.

In a state in which the cam member 90 rotatably comes into contact with a lower end surface of the sub cover 80, the cam member 90 projects out of the main cover 15. The first, second and third sets of three cam grooves 92, 94 and 96 are defined on the outer surface of the cam member 90, so that the engagement lips 71a of the projecting arms 71 of the brake drum moving member 70, having passed through the holes 81 of the sub cover 80, can be engaged in the first, second and third sets of three cam grooves 92, 94 and 96. As described above, the respective sets of cam grooves 92, 94 and 96 have different engagement heights. Inclined surfaces are formed between the cam grooves 92, 94 and 96. As a consequence, as the cam member 90 is manually rotated, the engagement lips 71a of the projecting arms 71 of the brake drum moving member 70 can be smoothly moved between the cam grooves 92, 94 and 96.

Hereafter, the operation of the brake device for the bait casting reel according to the present invention, constructed as mentioned above, will be described in detail.

Figure 6:
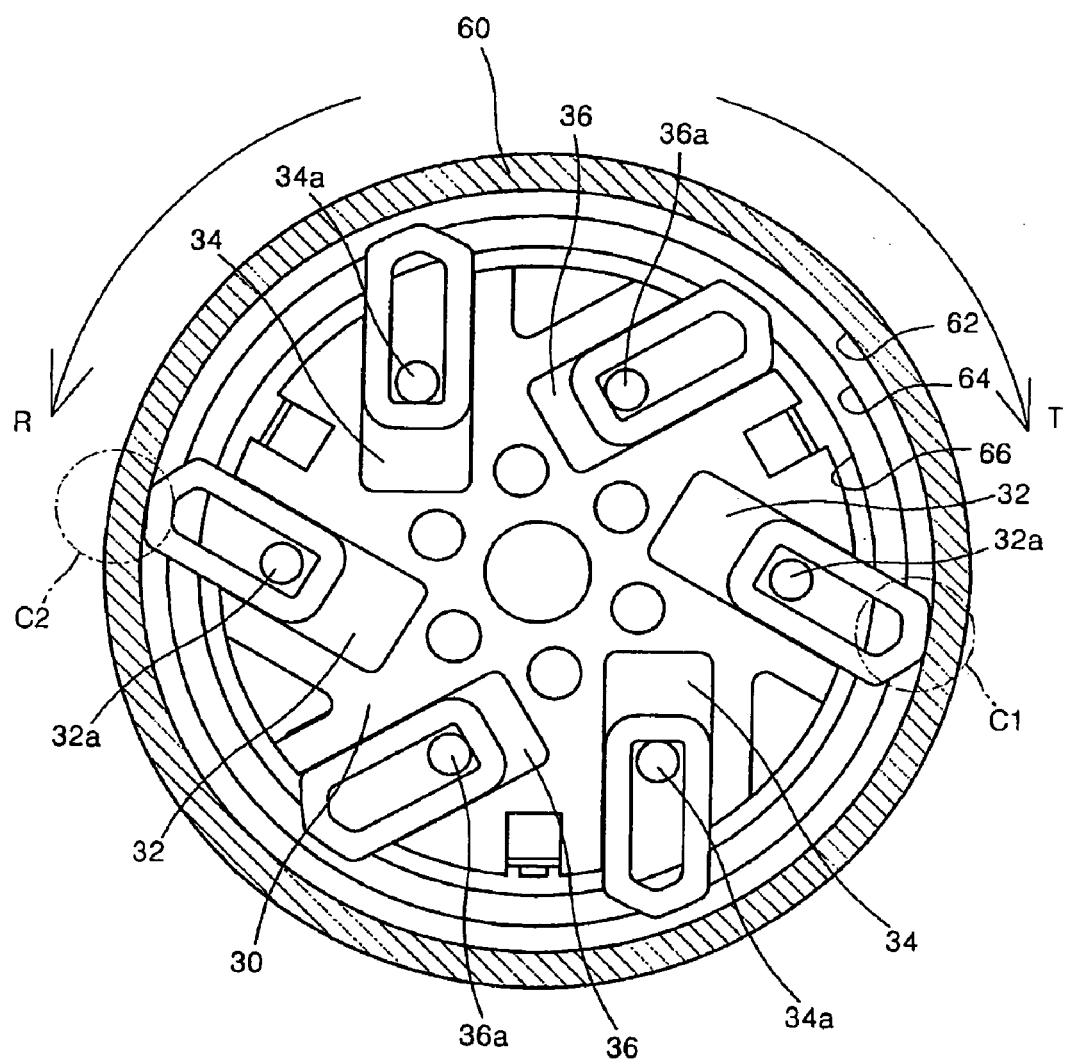
FIG. 6 is a bottom view illustrating a state in which two brake shoes are brought into frictional contact with a first braking surface.
Figure 7:
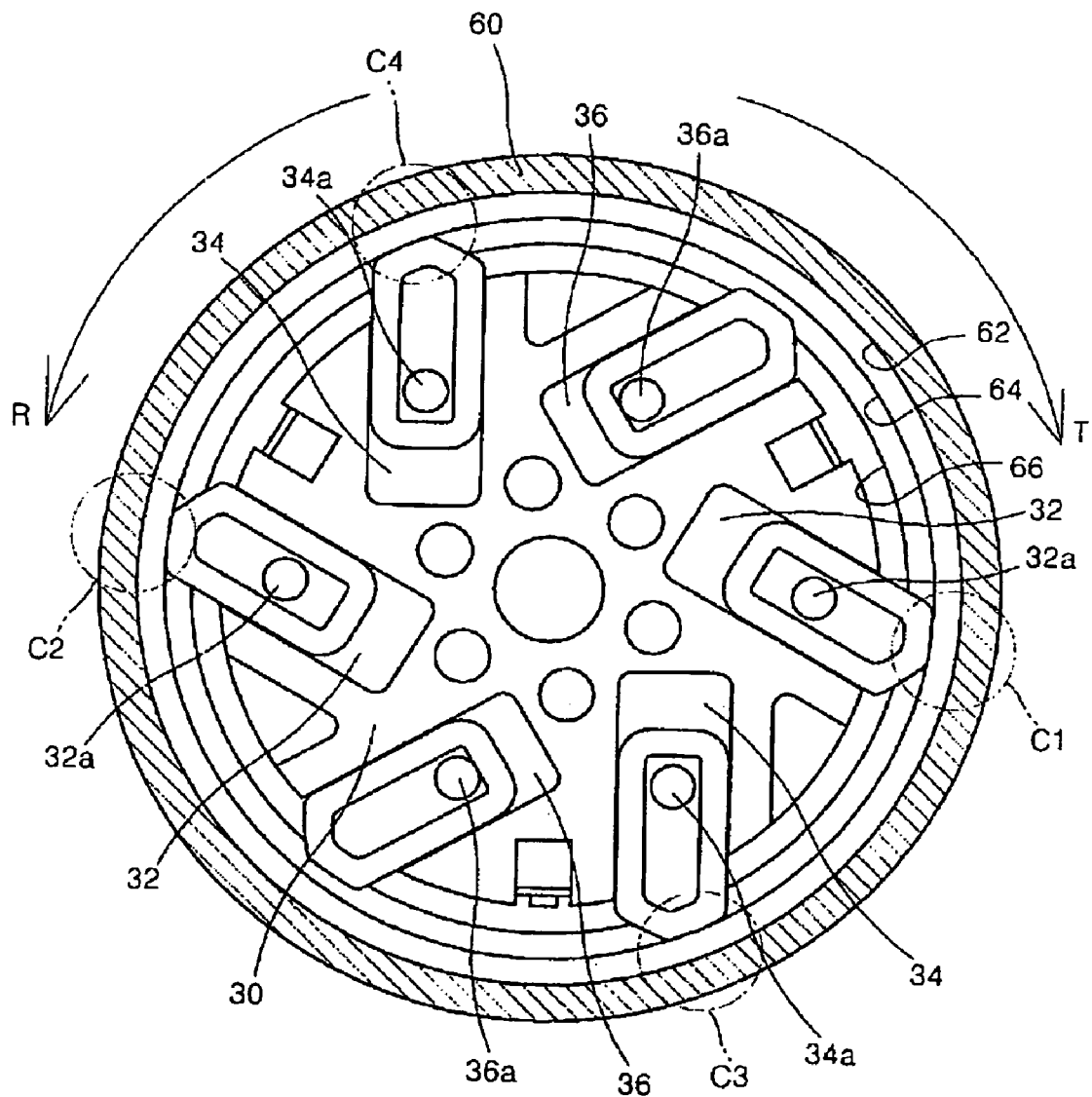
FIG. 7 is a bottom view illustrating a state in which four brake shoes are brought into frictional contact with a second braking surface.
Figure 8:
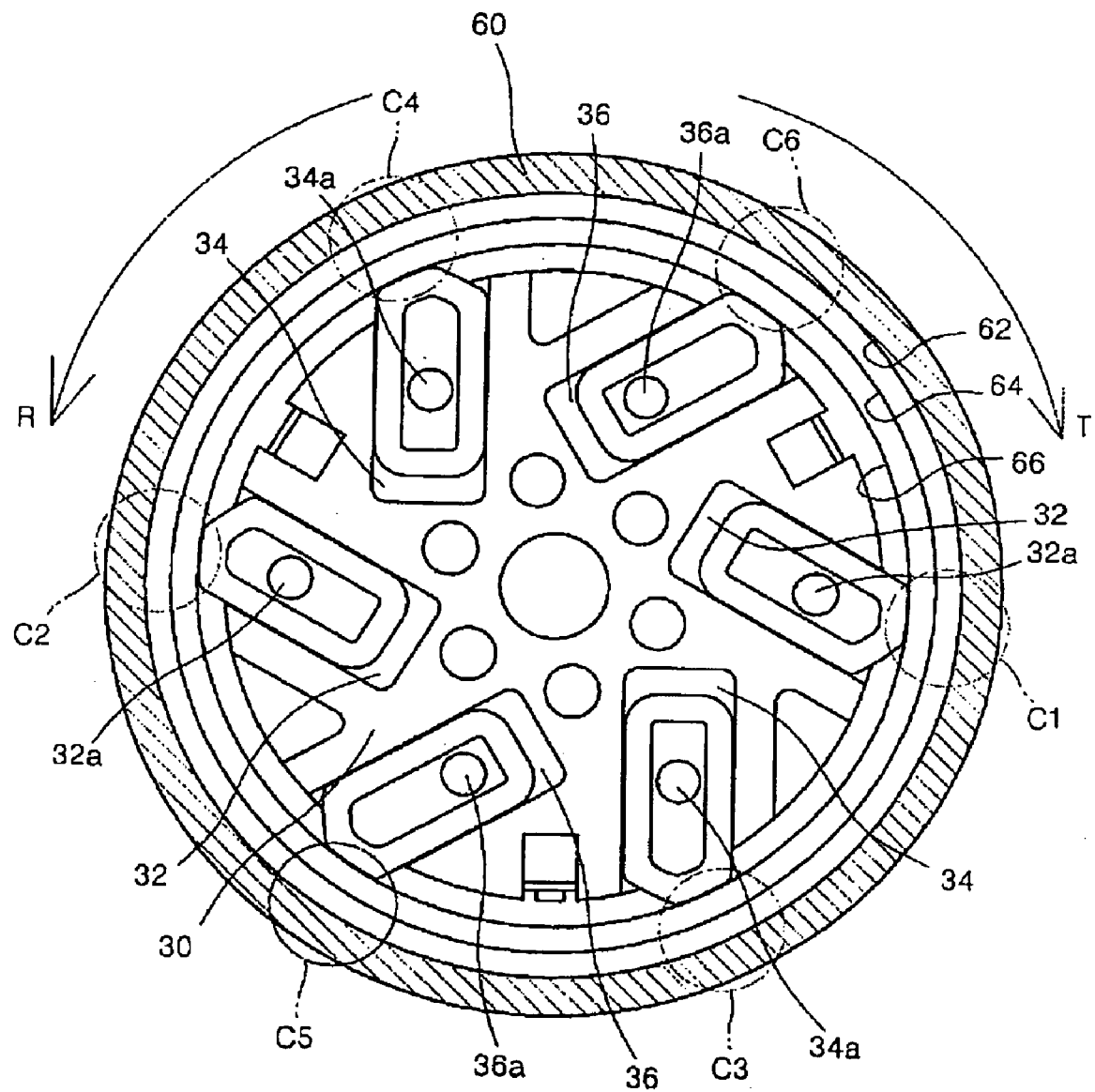
FIG. 8 is a bottom view illustrating a state in which six brake shoes are brought into frictional contact with a third braking surface.

FIG. 6 is a bottom view illustrating a state in which two brake shoes are brought into frictional contact with a first braking surface; FIG. 7 is a bottom view illustrating a state in which four brake shoes are brought into frictional contact with a second braking surface; and FIG. 8 is a bottom view illustrating a state in which six brake shoes are brought into frictional contact with a third braking surface.

A user can move the brake shoes 40 between the first, second and third braking surfaces 62, 64 and 66 by manually rotating the cam member 90.

For example, as the user rotates the cam member 90 so that the engagement lips 71a are engaged in the first cam grooves 92, the brake drum moving member 70 and the brake drum 60 are moved as far away from the spool 20 as possible. In this case, the shoe housing 30 is moved to a position which faces the first braking surface 62, and as shown in FIG. 6, only the contact parts 41 of two brake shoes 40 which are received in the first pair of sliding grooves 32 are brought into frictional contact with the first braking surface 62 to perform a braking function (see sections C1 and C2). Here, the brake shoes 40 which are received in the second and third pairs of sliding grooves 34 and 36 are limited in their movements by the second and third pairs of insertion pins 34a and 36a so that they are not brought into frictional contact with the brake drum 60.

Next, as the user further rotates the cam member 90 so that the engagement lips 71a are engaged in the second cam grooves 94, the brake drum moving member 70 and the brake drum 60 are slightly moved toward the spool 20 by an elastic force of the springs 75. Thereupon, the shoe housing 30 is moved to a position which faces the second braking surface 64, and as shown in FIG. 7, the contact parts 41 of four brake shoes 40 which are received in the first and second pairs of sliding grooves 32 and 34 are brought into frictional contact with the second braking surface 64 to perform a braking function (see sections C1, C2, C3 and C4). However, the brake shoes 40 which are received in the third pair of sliding grooves 36 are limited in their movements by the third pair of insertion pins 36a so that they are not brought into frictional contact with the brake drum 60.

Then, as the user rotates the cam member 90 still further so that the engagement lips 71a are engaged in the third cam grooves 96, the brake drum moving member 70 and the brake drum 60 are moved as close to the spool 20 as possible by the elastic force of the springs 75. By this, the shoe housing 30 is moved to a position which faces the third braking surface 66, and as shown in FIG. 8, the contact parts 41 of six brake shoes 40 which are received in the first, second and third pairs of sliding grooves 32, 34 and 36 are brought into frictional contact with the third braking surface 66 to perform a braking function (see sections C1, C2, C3, C4, C5 and C6). That is to say, all brake shoes 40 are brought into frictional contact with the brake drum 60.

Meanwhile, in a state in which the user manipulates the cam member 90 so that the engagement lips 71a are engaged in the first cam grooves 92 to allow only two brake shoes 40 to be brought into frictional contact with the first braking surface 62, after a weight and a fishhook having bait are connected to a distal end of the fishline L wound on the spool 20, by flicking a fishing rod at a large angle, the weight and bait are cast to a desired place. Thereupon, the fishline L wound on the spool 20 is paid out from the spool 20 due to the presence of the weight. In this procedure, as shown in FIG. 6, the spool 20 is rotated at a high speed in the casting direction T indicated by the arrow, and accordingly, the brake shoes 40 which are slidably received in the first pair of sliding grooves 32 are moved toward the center of the shoe housing 30. Therefore, the contact parts 41 of the brake shoes 40 are held apart from the first braking surface 62 of the brake drum 60.

Thereafter, if the weight freely falls and casting is thereby completed, a force for forcibly rotating the spool 20 is gradually removed, and a rotating force of the spool 20 which is operatively coupled with the spool driving mechanism, etc. is decreased. At this time, the brake shoes 40 which are slidably received in the first pair of sliding grooves 32 move toward the center of the shoe housing 30 due to inertia.

Then, if the weight completely falls into water, no force for rotating the spool 20 is applied to the spool 20, and the spool 20 is rotated only by its inertia. At this stage, the rotating force of the spool 20 is weak. At this time, since the brake shoes 40 retain the initial rotating inertia of the spool 20, as the rotational velocity of the spool 20 decreases, the brake shoes 40 move radially outward from the first pair of sliding grooves 32 due to their inertia. As a result, as shown in FIG. 6, two contact parts 41 are brought into close contact with the first braking surface 62 to perform a braking function (see sections C1 and C2). By this fact, the rotational force of the spool 20 abruptly decreases, and the fishline L wound on the spool 20 is not paid out from the spool 20 and thereby is prevented from becoming tangled.

Since every user applies a different level of casting force, in the case of a user having a strong casting force, a braking force for the spool 20 must be increased accordingly. In this situation, a user can rotate the cam member 90 so that the engagement lip 71a are engaged in the second cam grooves 94 to allow four brake shoes 40 to be brought into frictional contact with the second braking surface 64 as shown in FIG. 7 (see sections C1, C2, C3 and C4), or so that the engagement lips 71a are engaged in the third cam grooves 96 to allow six brake shoes 40 to be brought into frictional contact with the third braking surface 66 as shown in FIG. 8 (see sections C1, C2, C3, C4, C5 and C6). This is enabled by manually rotating the cam member 90.

Furthermore, if it is necessary to wind the fishline L on the spool 20, the handle 22 is rotated to cause the spool 20 to be rotated in the casting direction R indicated by the arrow. By doing this, even when the brake shoes 40 are radially moved outward in the first, second and third sliding grooves 32, 34 and 36 and brought into contact with the brake drum 60, due to the different directions of the first, second and third sliding grooves 32, 34 and 36, frictional resistance is not generated between the contact parts 41 and the brake drum 60, so that it is possible to wind the fishline L on the spool without experiencing resistance.

As apparent from the above descriptions, the bait casting reel according to the present invention provides advantages in that, after casting of bait is completed, as brake shoes are moved radially outward in sliding grooves by centrifugal force generated due to the inertia of the brake shoes and are brought into frictional contact with an inner surface of a brake drum, braking is effected against the rotation of a spool, so that it is possible to prevent a fishline from being paid out and becoming tangled.

Also, in the case of a user having a different level of casting force, by rotating a cam member to cause the number of brake shoes brought into contact with first through third braking surfaces of the brake drum to change, it is possible to adjust a braking force which is generated due to frictional contact between the brake shoes and the brake drum, whereby the spool can be effectively braked.

Further, when winding the fishline on the spool, due to the direction in which the sliding grooves extend, no frictional force is generated between the radial outer ends of the brake shoes and the brake drum, whereby it is possible to wind the fishline without experiencing resistance.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A bait casting reel including a spool which has a spool shaft rotatably supported in a reel body and on which a fishline is wound, a spool driving mechanism for rotating the spool, a handle for manipulating the spool driving mechanism, a brake device for selectively limiting rotation of the spool, and a main cover for holding the brake device in the reel body, the brake device comprising:

a shoe housing coupled to the spool shaft to be rotated integrally therewith and having a plurality of pairs of sliding grooves which extend radially in different directions, and a plurality of pairs of insertion pins which project from bottom surfaces of the pairs of sliding grooves so that respective pairs of insertion pins are separated from inner ends of the respective pairs of sliding grooves by different distances;

a plurality of brake shoes received in the sliding grooves of the shoe housing and defined with a plurality of elongate holes in which the insertion pins of the shoe housing are inserted, respectively;

a guide plate coupled to the shoe housing to prevent release of the brake shoes from the sliding grooves of the shoe housing;

a brake drum for receiving the shoe housing and the guide plate, the brake drum defining a plurality of braking surfaces which have different inner diameters;

brake drum moving member into which the brake drum is fitted, the brake drum moving member having projecting arms which project downward and engagement lips which are formed at distal ends of the projecting arms;

a sub cover fixed to the main cover in a state in which the brake drum moving member is accommodated in the sub cover, and having holes for allowing passage of the engagement lips of the projecting arms of the brake drum moving member;

springs placed between the brake drum moving member and the sub cover; and a cam member rotatably coupled to the sub cover and defined with a plurality of sets of cam grooves in which the engagement lips of the projecting arms of the brake drum moving member, having passed through the holes of the sub cover, can be engaged, the respective sets of cam grooves having different engagement heights.

2. The bait casting reel as set forth in claim 1, wherein inclined surfaces are formed at boundary regions between two adjoining braking surfaces of the brake drum.

3. The bait casting reel as set forth in claim 1, wherein the plurality of brake shoes are slidably received in the sliding grooves, respectively, which are defined to extend in different radial directions which are set at predetermined angles from one another on the same plane adjacent to a center of the shoe housing.

* * * * *